United States Patent [19]  
Brumbaugh, Jr. et al.

[11] 4,284,380  
[45] Aug. 18, 1981

[54] MULTI-CAR TRAIN LOADING STATION

[75] Inventors: Owen E. Brumbaugh, Jr., Chicago; Paul Levin; Alston L. Reed, both of Northbrook, all of Ill.

[73] Assignee: Allen & Garcia Company, Chicago, Ill.

[21] Appl. No.: 69,834

[22] Filed: Aug. 27, 1979

[51] Int. Cl.³ .............................................. B65G 67/22
[52] U.S. Cl. ............................... 414/21; 141/83; 177/165; 222/55; 414/329; 414/786
[58] Field of Search ............... 414/21, 328, 329, 397, 414/786; 222/55, 77; 198/504, 505; 177/163, 165; 141/83

[56] References Cited  
U.S. PATENT DOCUMENTS

| 2,932,430 | 4/1960 | Dennis | 222/55 |
| 3,073,398 | 1/1963 | Blodgett et al. | 177/165 |
| 3,251,487 | 5/1966 | Eiesking | 414/329 |
| 3,430,751 | 3/1969 | Bateson | 198/505 |
| 3,897,868 | 8/1975 | Smith | 222/55 X |

FOREIGN PATENT DOCUMENTS

| 131162 | 6/1978 | German Democratic Rep. | 414/397 |
| 1034372 | 6/1966 | United Kingdom | 414/329 |
| 575499 | 10/1977 | U.S.S.R. | 177/163 |
| 643408 | 1/1979 | U.S.S.R. | 414/329 |

Primary Examiner—Leslie J. Paperner  
Attorney, Agent, or Firm—George F. Lee

[57] ABSTRACT

Cars of a multi-car train are loaded while in transit utilizing an overhead loading hopper into which a load out conveyor delivers bulk material such as coal in quantums to fully and evenly fill the individual receiving cars as each passes beneath the hopper and each quantum of material delivered to the hopper is specially measured to equal the predetermined gross loaded weight of the car in loading position less the car's actual weight as it was measured in transit. Loading of each car from the hopper is regulated by the speed of the conveyor and by an operator controlled diverter gate which initially directs the coal through an aft chute of the hopper which each car reaches first and then through a fore chute to complete its loading.

14 Claims, 7 Drawing Figures

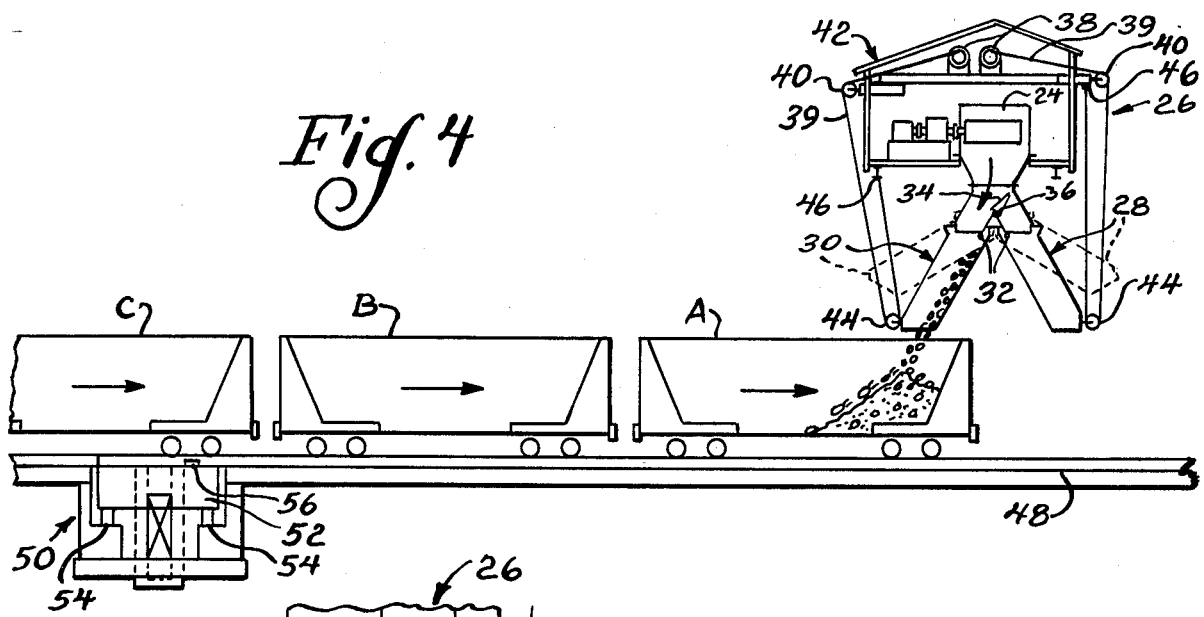
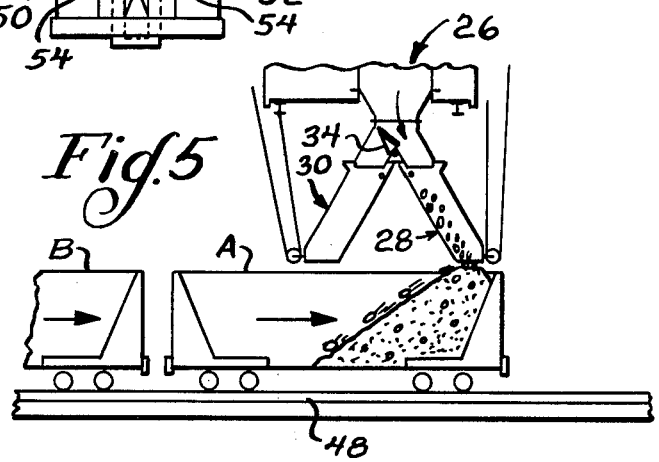
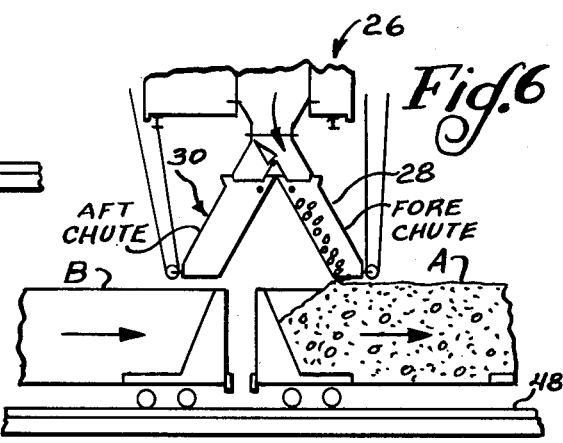
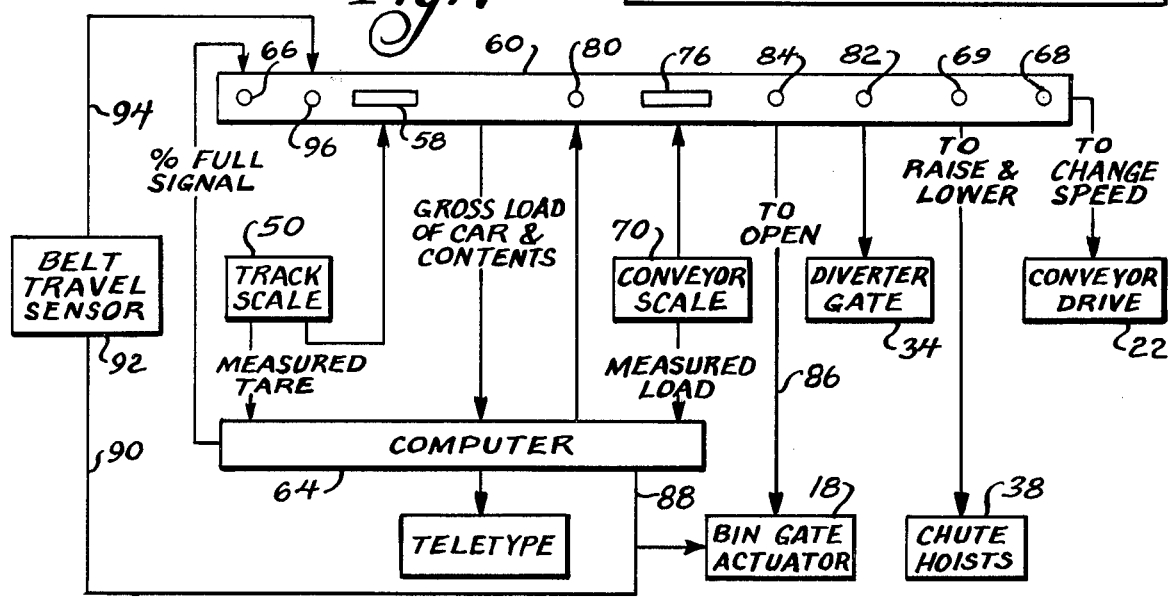

MULTI-CAR TRAIN LOADING STATION

This invention relates to novel means and method of loading each car of a multi-car bulk material train consisting of open-topped gondola, hopper or tub type cars, without halting the train. It is intended primarily to be used in loading out coal trains but is equally applicable to loading any fluent solid bulk material which can be conveyed on belt conveyors and shipped in open-topped railroad cars.

A principal object of the invention is to provide apparatus and method whereby each car of the train is fully and evenly loaded in succession.

A companion object thereof is to be able to effect such loading quickly, efficently, without halting the train and without loss of material through spillage.

Various loading apparatus and systems have been devised in the past for automatically loading each car of a multi-car train with determined amounts of such material. Norris U.S. Pat. No. 1,443,377 discloses one such arrangement in which each car passes beneath a loading hopper provided with a discharge gate which is triggered by the car as it aligns therebeneath to discharge a precise quantity of bulk material thereto. Morawski et al. U.S. Pat. No. 3,235,104 discloses an arrangement in which actuator means are operated by each car to open the hopper discharge gate when the car is in a receiving position and simultaneously shift remotely-located operator-viewed signaling means to a second state. The arrangement includes means which respond to the level of the load in the car to close the hopper discharge gate and switch the signaling means to a third stage of operation and utilizes still further means which respond to movement of each loaded car out of the loading area to restore the signal means to its original state. Giesking U.S. Pat. No. 3,251,487 discloses a loading arrangement wherein each car has a hinged hatch cover which in its vertical open position engages a cam-follower-controlled mechanism to initiate discharge of material from the hopper into the car. The car when loaded sinks on its springs to disengage the vertically open hatch cover from the cam-follower and stop the discharge. Munson U.S. Pat. No. 3,559,820 discloses a loading system utilizing means which compares electrical signals indicative of the actual position of the car and the actual weight of material charged into the car with signals proportional to the desired car position and weight of the materials to be charged so that the cars automatically stop at the correct bin position, are there filled with the desired amount from the bin and then moved to another bin or to the discharge position, all of this being determined by indicia on a punch card, computer program or the like. Nichols U.S. Pat. No. 2,136,560, Miller U.S. Pat. No. 2,788,134 and Miller U.S. Pat. No., 3,002,637 disclose loading systems which utilize shiftable discharge means such as a tiltable transfer chute or conveyor which permit direction of the discharge flow to be reversed and/or shifted between cars.

Customarily the cars in the train will have the same standardized load capacity and the same precise quantity of material is discharged into each car.

As a practical matter, such standardization is not always possible or desired. Availability of cars may be such that it is necessary to assemble cars of different physical dimensions in the same train. Instances may arise where customer requirements dictate the need to assemble cars of different load capacities in the same train. Also some of the cars making up a train may not have been completely emptied of their prior load. When the loading operation is conducted in a cold climate, conditions may be such that an unpredictable portion of the load will freeze and, when the load is dumped, a frozen residue of unknown amount remain in the car which changes its actual load capacity.

A feature of this invention is that each of the cars of a multi-car train, although having different load capacities, can be filled to its full capacity from a loading chute and evenly thereacross with minimal loss or spillage of material, and without halting the train.

This the invention accomplishes by individually weighing each car of the train as it enters the loading station and relating this information to the predetermined gross weight of the car (its rated load capacity plus tare weight). The difference therebetween represents the actual load capacity of the car or quantum to be loaded into that car. Also, in the loading process, the material with which the cars are filled is continuously weighed as it is conveyed from the supply source to the loading chute so that each quantum delivered to the loading chute can be accurately related to the actual load capacity of the car passing beneath the chute to receive it.

Thus, it is a feature of the invention that only that specially measured quantum which suffices to fully load the receiving car without overloading is actually discharged to the loading chute.

Another feature of the invention is that the delivery speed of the quantum to the receiving car is related to the speed at which the train moves through the loading station wherefor each car is fully and evenly loaded in the time it takes the car to move beneath the loading chute.

Another feature of the invention is that loading of each car is initiated through an aft-located chute as the forward end of the car arrives beneath the discharge end therefor and the loading is completed through the discharge end of a fore-located chute which the car subsequently reaches, the discharge ends of the two chutes being spaced apart a distance greater than the spatial separation of the cars and less than their length.

Thus another feature of the invention is that each car can be fully loaded and also evenly across the width and length thereof without halting the movement of the train through the loading station and without experiencing spillage or loss of material in the loading act.

A further feature or advantage of the invention is that it provides means which prevent each individual car of the train from being overloaded. At the same time, said means allow the operator to adjust the loading rate to variable conditions created by changes in the flow of material to the loading station from the supply source and/or so that each car can be fully and evenly loaded with its designated quantum in the interval of time permitted.

Another feature of the invention is that the loading of each car is operator-initiated and the actual loading of each car remains subject to the operator's control.

In a presently preferred embodiment of the invention the engine pulls each car across a track scale on its way to the loading station and the weight of each car is measured by the track scale and the information fed to the operator's station. As each car arrives beneath the aft chute of the loading hopper the operator opens the discharge gate of a load-out bin which loads material onto a load-out conveyor discharging into the loading hopper. As the car moves far enough to locate its forward end beneath the discharge end of the fore located chute the operator diverts the discharge from the aft-located chute to the fore-located chute. The conveyor belt embodies a second scale which weighs the material as it is delivered by the conveyor to the hopper and continuously feeds this information to the operator station where it is compared to the gross weight of the car (its load capacity plus tare weight) less the actual weight as measured by the track scale. In the operator station, the information is fed into a computer, or other load control means, which is adapted to automatically close the bin gate as soon as it senses that the quantum discharged from the bin onto the conveyor equals the predetermined gross weight of the receiving car less the weight of the receiving car as measured by the track scale. It also operates a signal which alerts the operator that the gate has been closed and the system is ready for the operator to initiate the next loading cycle. The information from the track scale and conveyor belt scale is visually displayed to the operator himself who can make the comparison and initiate closing of the bin gate. Other signal means are provided, which alert the operator when the car is "nearly full" or has been filled to a predetermined fraction of its load, to give the operator an opportunity to inspect the loading of the car and then to adjust the loading rate if necessary.

In accordance with the invention the inclination of the loading chutes as well as the conveyor speed are adjustable by the operator so that, under his control, each quantum may be fully and evenly loaded into the respective receiving cars in the interval each takes to pass through the loading station.

A more detailed description of the invention follows and from which further features and advantages of the invention will be apparent and/or will become so upon consideration thereof.

Referring therefor now to the accompanying drawings wherein the components of a loading system in accordance with the invention are shown diagramatically:

FIG. 4 is an elevational view taken from the right-hand side of FIG. 1 and illustrates the forward end of a car being loaded through the aft-located chute of the hopper as the car passes therebeneath;

FIG. 5 illustrates the loading of the car being continued through the fore-located chute of the hopper as the forward end arrives therebeneath; and FIG. 6 illustrates the location of the next car beneath the aft located chute as the filling of the next preceeding car is completed;

FIG. 7 is a schematic layout of the loading system and shows the operational relation of its components in accordance with the invention.

Figure 1:
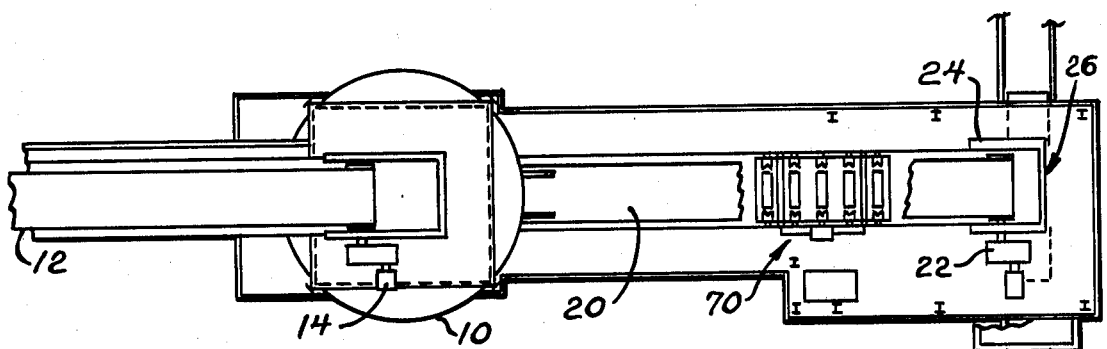
FIG. 1 is a top plan view of the apparatus comprising a loading system in accordance with the invention.
Figure 2:
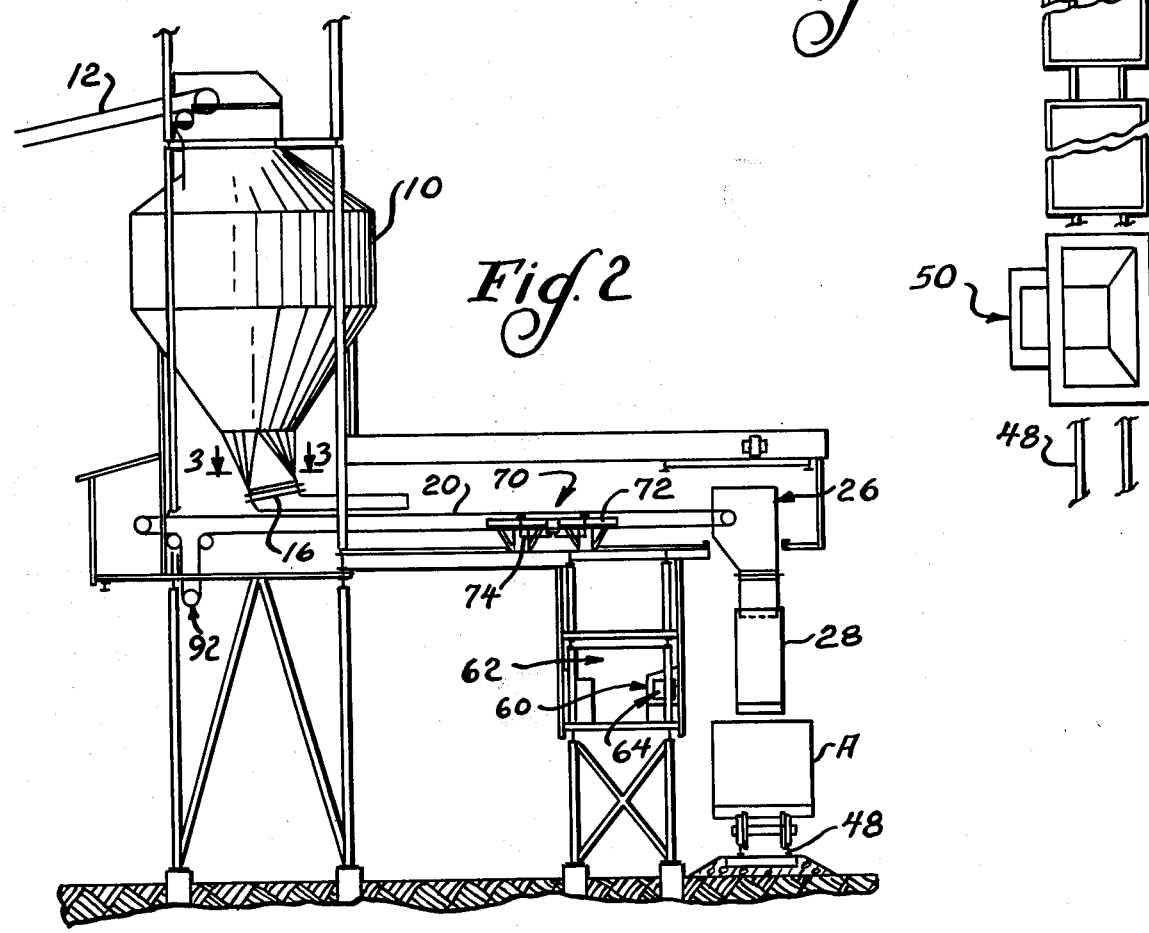
FIG. 2 is a side elevational view thereof.

Referring now more specifically to the several views of the drawing wherein like parts are identified by like reference numerals and first to FIGS. 1 and 2, a coal loading station or system exemplary of the invention is illustrated as comprising a load-out bin 10 which may be of conventional structure and having a capacity in excess of the rated load capacities of the individual cars of the coal train to be loaded therefrom. For example, where the coal cars have a load capacity of about 100 tons each, bin 10 may have a capacity in the order of 200 tons. As shown bin 10 is preferably top loaded by a feed conveyor 12 which receives coal from a clean coal screening station, stock pile or other area of the mine (not shown) and in the loading operation is continuously driven by suitable drive means 14. The load out bin 10 is provided with suitably located sensors or probes (not shown) which regulate the feed conveyor speed and/or the opening of the reclaim gates at the mine through which coal is delivered to the feed conveyor wherefore an appropriately high level of coal can be maintained in the bin which prevents its emptying out during the loading operation.

Figure 3:
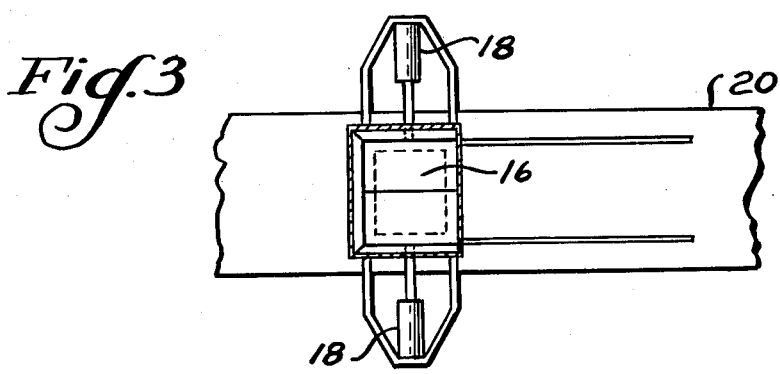
FIG. 3 is a fragmented view taken along lines 3—3 in FIG. 2 and illustrates the bin gate and actuating means therefor.

In the bottom of the bin 10 is an aperture over which is slidably mounted a discharge gate 16 which is opened and closed by suitable actuator means which as the illustrated pair of hydraulically operated pistons 18 (FIG. 3).

Gate 16 when opened permits discharge of coal from bin 10 onto the near end of a loadout conveyor 20 located therebeneath, the conveyor discharging the coal at its opposite end into the top or head 24 of a loading hopper 26. Said hopper, as illustrated best in FIG. 4, has fore and aft loading chutes 28, 30 through which each car of the train is loaded with coal as it is passed beneath the discharge ends thereof. Loadout conveyor 20 is continuously driven by drive means 22 and preferably its upper run between its coal receiving end beneath the bin gate 16 and its discharge end into the loading hopper 26 is supported on suitably spaced idler rollers which impart a trough-shape thereto for containing the coal which it carries to the loading hopper 26. In one embodiment of the invention wherein the system is adapted for loading railway cars averaging a hundred ton capacity the loadout conveyor is continuously driven at a speed which is operator-adjustable between 0 and 500 FPM to deliver coal to the hopper 26 at a rate of 0 to 3500 TPH.

Referring again to FIG. 4, it will be noted that the fore and aft chutes 28, 30 of the loading hopper have their upper ends pivotally connected to the loading head 24 as by means 32 so as to be in communicating relation therewith. In their illustrated down or normal loading position the loading chutes are inclined 60° to the horizontal and their lower discharge ends are spaced apart only slightly more than the separation of the cars and are located at a height of about 6 inches above the cars for most effective feed control. The inclination of the loading chutes 28, 30 is not fixed at 60° to the horizontal, some installations may require a steeper angle. At 34 is an operator-controlled diverter gate which is pivotally mounted within the hopper head 24 so the under the actuation of a suitably connected hydraulic piston (not shown) it may be swung on pivot 36 to selectively divert the coal discharge between the fore-located chute 28 and the aft located chute 30 as hereinafter explained. At 38 are hoists constituting operator-control means for individually raising the lower discharge ends of the chutes 28, 30, as for example, to allow the train locomotive and its caboose to pass therebeneath and/or to accomodate changing the inclination of the chutes and thereby the position of coal discharge during the loading act.

As depicted in FIG. 4, hoists 38 each comprise a reversibly rotated drum on which is wound cable 39 or the like which passes over a first pulley 40 mounted on the hopper housing 42, downwardly about a second pulley 44 fixed to the discharge end of the chutes and upwardly to a fixture 46 also on the hopper housing 42 wherefore in accordance with whether the drum is rotated clockwise or counterclockwise the discharge end of the chutes can be raised or lowered.

In accordance with this invention both the weight of the car being loaded and the amount or quantum of coal delivered thereto by the conveyor are monitored so that only that quantum which suffices to fully load the car without overloading or spillage will actually be delivered into the loading hopper 26 and discharged into the receiving car.

For this purpose, railroad track scale 50 of conventional construction is installed in the track 48 which leads into the loading station and over which the train locomotive and its cars pass into and through the loading station. As illustrated, said track scale 50 is installed in the approach to the loading station and ahead of the aforementioned aft and fore located loading chutes 30, 28 of the loading hopper. As schematically illustrated in FIG. 4 said track scale 50 includes a weighbridge or scale platform 52 and associated load cell assemblies 54 as well as switches 56 on the weighbridge rails plus the usual electronics such that each car of the train as it is moved across the scale platform is accurately weighed and the information delivered and fed into the computer 64 (FIG. 7) and visually displayed at 58 on control console 60 (FIG. 7) located in the operator's station 62. The construction and operation of such track scales are well known wherefore the same will not be further described except to point out that such scales are typified by model 10-32 of Ramsey REC Ltd. of Richmond Hill, Ontario, Canada also by the Streeter-Amet scale model AMN-4016 of Mangood Corporation, Grayslake, Ill. and by the railroad track scale of Railweight Inc., of Northfield, Ill. Preferably each load cell 54 is enclosed in a temperature-controlled environmental shroud complete with insulation, electric heaters and automatic temperature controls which provide protection against errors which might otherwise result from drafts and changes in ambient temperature. The electronics will also be temperature-controlled to protect against moisture and temperature influences which might cause signal drifts and weighing errors. The system perferably will be provided with locomotive elimination and rollback re-syncronization features as are also known.

Also in accordance with the invention, the loadout conveyor 20 embodies a conventional belt scale 70 as typified by Ramsey model 10-14-5 (Ramsey Engineering Company, Saint Paul, Minn.) and Thayer Scale Model 2RF2-36 (Hyer Industries of Pembroke, Mass.) which monitors the weight of coal discharged from bin 10 through gate 16 onto the conveyor 20 and conveyed thereby to the loading hopper 26 and its chutes 28, 30. Said scale 70 as is conventional comprises a weighbridge assembly 72 having associated load cell assemblies 74 and electronics such that it is capable of measuring the weight of the coal as it is discharged from bin 10 and carried by conveyor 20 therealong to the loading hopper 26. This information as to the weight of the conveyed coal is also fed to the control console 60 where it is visually displayed at 76 for visual inspection by the operator and is fed into the computer 64.

In a preferred form of the invention, computer 64 is programmed to receive information from both the belt scale 70 and the track scale 50, to add the two amounts and to compare the sum thereof with information as to the predetermined or calculated gross weight of the cars (load capacity plus tare) which is also fed into the computer and to energize a visual or audible signal 80 to which the operator reacts and/or to energize circuits which act on the actuator means 18 to close the bin gate 16 when it senses that the sum of the readouts from the track scale 50 and the belt scale 70 equal the calculated gross weight of the car.

The track scale 50 and belt scale 70 thus together constitute means which prevent overloading of the car either by alerting the operator when the maximum load for each car has been loaded onto the conveyor so that the operator can close the bin gate 16, or by operating circuits which automatically close the bin gate to prevent said overloading.

The system also provides for operator-control of the loading of each car as well as override safeguards which allow the operator to adjust the loading rate to variable conditions created by changes in the speed of the train being loaded or by changes in the amount of material being fed to the loadout bin 10. This the operator is able to accomplish by increasing or decreasing the speed of conveyor 20 as at 68 (FIG. 7) and/or the inclination of the loading chutes 28, 30 at 69 (FIG. 7). All of the controls for the system are therefore housed in the operator station 62 which is so located that the operator can visually monitor the physical act of loading each car as it occurs and thereby be in position to take such compensating steps or acts as may be necessary.

The loading operation will now be described. It is initiated by energizing the feed conveyor drive 14 so that the feed conveyor 12 will load and thereafter maintain a required level of coal within the loadout bin 10, usually no less than one car load. The loadout conveyor drive 22 is also energized to start the loadout conveyor 20 in motion which then continuously moves at a constant speed unless adjusted by the operator. At the start of the loading operation, bin gate 16 is closed and the diverter gate 34 in the head 24 of the hopper 26 is set so that coal delivered to it from conveyor 20 will discharge through the aft chute 30. The car sequence number, the car identification number and the predetermined maximum gross of each car of the train is also recorded and/or is fed into the computer 64 in the sequence that each car will cross the track scale 50 and be brought to the chutes of the loading hopper 26. When ready, the operator signals the train engineer to proceed along track 48 toward the loading hopper 26 at a constant speed of about 0.27 MPH to correspond to the desired loading rate. This speed may be different at various installations, depending on the desired loading rate.

As each car in succession crosses the track scale 50, its load cells 54 will be responsive to the weight of the car and this will be translated by the electronics into a read out at 58 which represents the actual weight of the car as it enters the loading station. With the information which is thus displayed visually to the operator, the net weight or quantum of coal to be loaded into the individual cars is calculated by subtracting the actual weight of the receiving car as it is measured by the track scale 50 from the predetermined gross weight for that car. The difference between the car tare weight as measured by the track scale 50 and the predetermined gross weight of the car represents the quantum of coal which can be loaded into that car without overloading it. That quantum will be the same as the calculated load capacity of the car or some lesser figure depending on whether any residue remains in the car after its previous dumping. If the computer 64 is used, it will make the aforesaid calculations; otherwise the operator must make the calculations himself.

Assuming the chutes 28 and 30 are at a height as illustrated in phantom lines in FIG. 4 which permits the locomotive to pass therebeneath, the chutes are now lowered to their loading position illustrated in full lines as the first car A enters beneath the aft loading chute 30. This is accomplishd by actuating controls 69 on the operator console (FIG. 7). Thereafter as each car, for example the first car A of FIG. 4, reaches the aft-located chute 30 of the loading hopper 26, the operator will manually operate a switch 84 on console 60 which energizes a circuit 86 causing the pistons 18 to open the bin gate 16 and initiate discharge of coal from bin 10 onto the loadout conveyor 20. As the coal discharges from loadout bin 10 onto the loadout conveyor 20 and thereby to the loading hopper 26 it is also weighed by the belt scale 70. This information is fed to the console 60 where it is displayed at 76 and/or into the computer 64 and continuously compared with the previously calculated net weight of the coal to be loaded into that car passing beneath the loading chutes.

Loading of the car is thus initiated through the aft-located chute 30. As the train continues to move in a forwardly direction, the forward end of the car (e.g. Car A in FIG. 4) passes beyond the discharge end of the chute 30 and arrives beneath the discharge end of the fore-located chute 28. At this time, the operator will actuate control 82 on the console to operate hydraulic mechanisms (not shown) to move the diverter gate 34 to its alternate position as illustrated in FIG. 5 where it closes chute 30 so that the loading of Car A is now completed through the open fore-located chute 28.

The readout of the belt scale 70 is monitored by the computer 64 which may be adapted to one of two possible modes, automatic or manual.

The readout of the belt scale 70 can be monitored visually at 76 on console 60 and as soon as the quantum load from the bin 10 to the conveyor 20 equals the calculated net weight of the car being loaded (FIG. 6), controls 84 can be operated to close the bin gate 10.

In the primary or automatic mode the computer 64 is adapted to energize operating circuit 86 of the actuator as a means 18 to close the bin gate 16. In a second, possible mode, the manual mode, the computer is so adapted that when the quantum loaded onto the conveyor 20 equals the net load of the car, that is the gross weight of the car less its actual weight as measured by the track scale 50, then it will energize the aforementioned visual and/or audible alarm 66 and alert the operator to close the bin gate 16 by operating control switch 84. In either of the two possible modes of the computer, the computer also energizes a second circuit 90 which actuates a belt travel sensor 92 which in turn operates a switch in a further circuit 94 as soon as the bin gate 16 has been closed. As said second circuit 90 energizes the belt travel sensor 92 it will also inactivate the actuator means circuit 86 so that the operator can not open the bin gate 16. As soon as the belt travel sensor 92 senses that the conveyor belt 20 has moved far enough to be cleared of all the coal discharged from the bin it will energize a signal light 96 on the operator's console 60. This indicates to the operator that scale 70 is ready for measuring the load to be delivered to the next car B and that he may reopen the bin gate when the next car enters the loading station and is in loading position.

At this time, all the coal should have cleared fore-located chute 28 and the operator will manually operate the diverter gate control switch 82 to shift gate 34 to close the fore chute 28 and reopen the aft located chute 30 preparatory to putting coal into the next car B.

Preferably, also, computer 64 will be programmed to sound a signal 66 which will alert the operator when the car being loaded is "nearly full" that is, at some fraction, preferably greater than one-half the car load. This signal alerts the operator to visually inspect the loading of the car and thus provides him an opportunity to adjust the speed of the loadout conveyor 20 and/or the inclination of the forward chute 28 should he determine that the car is being loaded too fast or too slow.

Thus having described the invention we claim:

1. Method of loading cars of a multi-car train with fluent solid material such as coal in which the cars pass beneath a loading chute without halting, comprising the steps of measuring the weight of each car of the train as it approaches the chute;

feeding the material into the chute from a supply during the interval of time the car takes to pass beneath the chute;

weighing the material as it is fed to the chute;

interrupting said feed when the weight of the material equals the predetermined gross weight of the car less its measured weight; and controlling the rate of feeding said material to the chute such that each car is fully and evenly filled from the chute in the interval the car is passing beneath the chute.

2. Method of loading cars of a multi-car train with fluent solid bulk material such as coal without halting the train comprising the steps of measuring the weight of each of the cars as it enters a loading station including a hopper having fore and aft chutes, the discharge ends of which are spaced apart a distance greater than the separation of the cars in said train, delivering a quantum of the material from a supply source to the hopper equal to the predetermined gross weight allowed for the car and its load less the weight of the car measured as it entered the loading station.

initiating discharge of the delivered quantum of material through the aft chute of the hopper into the fore end of the car as said fore end aligns therewith, diverting the discharge of said quantum of material from the aft chute to the fore chute as the fore end of the car aligns therewith to complete its filling, and controlling the speed of the delivery of said quantum of material to the hopper such that the cars are fully and evenly loaded therewith without overloading and spillage as they pass beneath the chutes of the hopper.

3. Method of loading cars of a multi-car train with fluent solid bulk material such as coal without halting the train comprising the steps of measuring the weight of each of the cars as it enters a loading station including a hopper having fore and aft chutes the discharge ends of which are spaced apart a distance greater than the separation of the cars in said train.

delivering a quantum of the material to the hopper equal to the predetermined gross weight allowed for the car and its load less the weight of the car measured as it entered the loading station by discharging the material onto a moving conveyor which delivers the material to the hopper, weighing the material as it is delivered to the hopper and interrupting the discharge of the material onto the conveyor when the quantum thereof is discharged to the conveyor, initially discharging the material through the aft chute of the hopper into the fore end of the car as said fore end aligns therewith, diverting the discharge of said material from the aft chute to the fore chute as the fore end of the car aligns therewith to complete its filling, and controlling the speed of the delivery of material to the hopper such that the cars are fully and evenly loaded without overloading and spillage as they pass beneath the hopper chutes.

4. Method of maximally loading each car of a multi-car coal train without halting the train comprising the steps of slowly moving the train to bring in succession each car first across a track scale and then beneath an overhead loading hopper having near and remote exits through which each car is successfully loaded as the car passes therebeneath, said near and remote exits being spaced apart less than the length of the cars and more than the space between each pair of cars;

measuring the weight of each car as it moves across the track scale in advance of its passing beneath the near exit of the loading chute;

discharging coal from a load-out bin onto a loadout conveyor which discharges into the loading hopper;

measuring the weight of the coal discharged onto the load-out conveyor and limiting the weight of the coal thus loaded onto the conveyor from the bin to the difference between the measured weight of the receiving car beneath the loading hopper and the predetermined maximum gross weight allowed for the car when loaded;

relating the speed of the load-out conveyor to the speed of the train such that the measured load of coal discharged from the bin onto the conveyor is discharged through the loading hopper into the receiving car therebeneath evenly over the length of the car in the time interval the car takes to pass beyond the near and far exits thereof; and repeating the procedure for each coal car of the train.

5. Apparatus for loading fluent bulk material such as coal into each car of a multi-car train comprising a loading hopper having discharge means beneath which the train moves;

a first scale means over which each car of the train is moved to measure the actual weight of the car as it enters beneath the hopper discharge means for loading;

a load out bin for containing material with which each car is to be loaded;

the bin having a normally closed gate;

a load-out conveyor beneath the bin gate which discharges into the hopper;

means for opening the bin gate to allow discharge of material onto the conveyor for delivery to the hopper as each car enters beneath the hopper discharge means;

further scale means which weigh the material discharged onto the conveyor; and means which indicate when a quantum of material as measured by the further scale means has been discharged from the bin onto the loadout conveyor which equals the gross weight of the entering car when it is fully loaded less its actual weight as measured by the first scale means.

6. The apparatus of claim 5 wherein the means for opening the gate is operator-controlled to initiate each car loading.

7. The apparatus of claim 5 further including means for changing the delivery speed of the load-out conveyor.

8. The apparatus of claim 5 wherein the indicator means is adapted to close the bin gate when the quantum has been discharged onto the load-out conveyor.

9. The apparatus of claim 8 including signal means which indicate to the operator when an amount of the material discharged to the load-out conveyor equals a predetermined fraction of the quantum.

10. The apparatus of claim 5 wherein the indicator means for closing the gate includes a computer into which is fed information as to the calculated gross weight of the car when fully loaded, the first scale means feeding thereto information as to the actual weight of the entering car, and the further scale means feeding information thereto as to the weight of the material being discharged onto the loadout conveyor, the computer being adapted to add the information received from the first and further scale means, compare the sum thereof with the information received as to the calculated gross weight of the car and signal the actuator means to close the gate when the sum equals the calculated gross weight of the car.

11. The apparatus of claim 5 wherein the discharge means of the loading hopper includes a fore chute and an aft chute, and the hopper includes a diverter gate for selective loading of each car through said chutes as it enters and passes beneath the loading hopper.

12. The apparatus of claim 11 wherein said fore and aft chutes are pivotally mounted to permit operator-controlled raising and lowering of the discharge end of said chutes.

13. The apparatus of claim 11 wherein the discharge ends of the chutes are spaced apart a distance greater than are the cars of a train to be loaded while passing therebeneath.

14. The apparatus of claim 13 including operator controlled means for adjusting the discharge speed of the load-out conveyor, the inclination angle of the fore and aft chutes and the position of the diverter gate during loading of each car.

* * * * *